United States Patent Office

3,539,474
Patented Nov. 10, 1970

3,539,474
INSULATION COMPOSITION WHICH EXPANDS IN USE
John G. Sommer, Jr., Akron, Ohio, assignor to The General Tire & Rubber Company, a corporation of Ohio
No Drawing. Filed Sept. 29, 1967, Ser. No. 671,595
Int. Cl. C08g 53/10
U.S. Cl. 260—2.5                     7 Claims

ABSTRACT OF THE DISCLOSURE

A flexible, room curing insulating composition is composed of boric acid and the reaction product of an epoxy resin and a flexibilizing agent and further including a blowing agent which reacts to cause the insulation to foam at elevated temperatures, thereby improving the ablation properties thereof. This novel composition is especially applicable for use in protecting the combustion chamber of rocket motors.

---

During the combustion of propellants within the chamber of a rocket engine, extremely turbulent flow conditions and elevated pressures are encountered. This environment places a severe strain on the rocket chamber as well as the exhaust nozzles and other parts of the rocket structure. Even though the combustion of the rocket propellants is of relatively short duration, the extreme temperatures and turbulence can cause failure of even the strongest and best high temperature alloys of iron, titanium, tungsten, and the like if these alloys are otherwise unprotected. Consequently, a vital portion of the rocket, or the entire rocket itself, can be eventually destroyed or rendered incapable of completing its designated task.

The extremely active interest in rocket motors, and the increased utilization of high temperatures in non-rocket applications, has necessitated a search for new materials which can be used as high temperature insulation. Through these efforts it has been found that various materials can be applied to the surface of metal alloys and other structural materials to serve as thermal insulating barriers. Their usefulness is typically measured by their ability to withstand the extreme temperatures and turbulent conditions to which they might be exposed. Among these materials are various ceramics, plastics, such as phenolic and polyester resins, and elastomeric materials.

One of the more successful rubber-like elastomeric materials for this purpose is that described in U.S. Pat. No. 3,347,047, filed on Jan. 7, 1966. The insulation material of that particular invention consists primarily of 3 to 200 parts of asbestos fibers, sufficiently large to be retained on a 325 mesh screen, incorporated into 100 parts of an elastomeric composition such as natural rubber or butadiene acrylonitrile and various other compatable materials. This material, and other rubber-like elastomer systems, are ablative, that is, they are consumed in service within the rocket chamber in such a manner that the chamber in protected from fuel combustion gases and elevated temperatures. The incorporation of asbestos fibers into the elastomer markedly improves the ability of the lining to withstand high flame temepratures and high velocity flow conditions prevalent within the rocket chamber during combustion.

Elastomeric insulating materials of the above described kind are generally compounded on a typical rubber mill and are calendered into sheets of uniform thickness and width. These sheets are then cut to size, applied to the interior surfaces of the thrust chamber and are then cured in place, or alternatively are precured to their final contour and then inserted and secured into position within the chamber utilizing a suitable adhesive or the like.

Regardless of whether the sheets are precured before installation, or are first installed and then cured in situ, both methods are laborious and time consuming, and result in appreciable amount of material being wasted.

The problems which are inherent with the use of sheets of millable elastomeric material have been at least partially overcome with the discovery of a trowelable insulating material which is chemically compatable with these other insulations. The details of this trowelable insulation are described in patent application Ser. No. 362,589, now U.S. Pat. No. 3,457,215, filed Apr. 27, 1964, by the present inventor and titled "Trowelable Insulating Material Containing Boric Acid and a Flexibilized Epoxy Resin." The disclosure of said application is incorporated herein by reference. The insulating material of that invention comprises a flexible epoxy resin which includes boric acid as well as a curing agent and fillers such as asbestos or the like.

Epoxy resins containing flexibilizing agents such as polyamides and polysulfides have been known in the art for a number of years. Yet, these resins, unless improved by the addition of boric acid were not capable of functioning as high temperature insulators. As stated in Ser. No. 362,589, now U.S. 3,457,215, the boric acid can be added in an amount of between 1 and 200 parts by weight for every 100 parts of epoxy resin, although as a practical matter, the addition of amounts in excess of 50 parts does not result in any appreciable improvement and is therefore generally unwarranted.

Although the above-mentioned flexible epoxy resin constitutes an otherwise satisfactory trowelable rocket insulation, attempts are constantly being made to reduce the weight and increase the efficiency and reliability of the various rocket components, including the insulation. It is to this end that the present invention is directed.

Accordingly, it is one object of this invention to produce a thermal insulation material which can be applied to a substrate in a relatively thin layer but which possesses the desirable insulating properties of an expanded light weight material.

Another object of this invention is a trowelable room temperature curing, thermosetting insulating material comprising the reaction product of an epoxy resin and a flexibilising agent, and containing boric acid, said material being improved by the addition of a heat activatable blowing agent.

Yet another object is a flexible insulating material useful as a lining in rocket motors and the like, said material comprising the reaction product of a polysulfide and an epoxy resin and including asbestos fibers and boric acid to improve the insulating properties thereof and a small but substantial amount of a blowing agent which is activated at elevated temperatures thereby causing the insulating material to expand in use.

These and other objects are accomplished in the manner to be hereinafter described and claimed.

The insulating material of the present invention comprises the reaction product of an epoxy resin and a flexibilizing agent, along with other compatable components preferably including boric acid and also including a minor amount of a heat activatable blowing agent. The resultant product is trowelable and flexible, and is capable of curing at room temperatures to form a substantially thermosetting composition.

Broadly, an epoxy resin may be described as a molecule containing at least one epoxy group consisting of an oxygen atom bonded with two carbon atoms and which can be converted into a thermoset state by curing. The epoxy resins useful in the invention are those which, when reacted with a flexibilizer and blended with the other components, give a trowelable composition. Resins of this type are typically characterized as being liquids at room temperatures i.e. temperatures below 65° C. Because of their better strength properties, aromatic epoxy resins are preferred over the aliphatic resins. The preferred polymers have an epoxide equivalent of at least 43 and contain more than 1,2 epoxy groups per molecule. Suppliers of epoxy resins of this type which are sold under various trade names such as Epon, D.E.R., D.E.N., Araldite and Epi-Rez are Shell Chemical Company, Dow Chemical Company, Ciba Company, Inc., and Jones Dabney Company.

Mercaptan terminated aliphatic polysulfides are the preferred flexibilizing agents in carrying out the teachings of the present invention. These polyfunctional polymers contain disulfide linkages in the backbone chain. They desirably have an average molecular weight of at least 300 and should naturally be compatable with the epoxy resin. Other flexibilizing agents, such as polyamides, certain dimines and polyesters, can also be used.

The epoxy resin and the polysulfide react chemically to form a chain composition of alternate molecules of these two components, with some self-polymerization of the epoxy resin also occurring. This reaction proceeds rather slowly and consequently a curing agent or a catalyst is generally needed to complete the polymerization within a reasonable length of time. Although there are a large number of commercially available curing agents that can be used wtih the present invention, one which has been found to be quite suitable for this purpose is 2,4,6-tris (dimethylaminomethyl) phenol, a tertiary amine sold under the trade name of DMP-30. It is, of course, desirable to avoid the use of curatives that might tend to cause decomposition of the blowing agent at low temperatures. This could include various oxidizing curing agents such as peroxides.

Generally, the ratio of the effective equivalent weight of the polysulfide to that of the epoxy resin should not exceed 1/1. As the amount of polysulfide approaches this upper limit, there is a very noticeable tendency for the polysulfide to prematurely terminate the polymerization reaction. On the other hand, as this equivalent weight ratio approaches zero, the flexibility of the insulating composition also decreases thereby resulting in an end product which is brittle and is prone to crack and disintegrate when bonded to a rocket structure which during firing, undergoes appreciable thermal expansion and is subjected to severe shock.

The blowing agent that is utilized in the teachings of the present invention is preferably selected from a large group of organic materials that undergo decomposition at elevated temperatures with the evolution of gas. The agent must be compatable with the other components present in the insulation and is preferably stable at room temperature. Particularly suitable are organic hydrazides, azo compounds and nitroso compounds including the following.

| Chemical composition: | Decomposition range (° C.) |
| --- | --- |
| p,p'-Oxy-bis (benzesulfonyl hydrazide) | 130–160 |
| Diphenylsulfon-3,3'-disulfonyl hydrazide | 148 |
| Urea/biuret mixture | 150–165 |
| Benzene-1,3-disulfonyl hydrazide | 145 |
| Azodicarbonamide | 195–200 |
| 4,4'-diphenyldisulfonyl azide | 142–145 |
| N,N'-dinitrosopentamethylenetetramine | 180–195 |

Normally, not more than about 50 parts would be used per 100 parts of epoxy resin in carrying out the teachings of the invention. Most of these compounds, because they contain amines also cause curing or cross linking the epoxide. Accordingly, when used in amounts greater than 50 parts, the agent is likely to promote homopolymerization of the epoxide to the exclusion of copolymerization, thereby resulting in the formation of a rigid cured product.

When the insulation is exposed to elevated temperatures such as those which exist within a flame or in proximity to burning propellant, a layer of carbonized char is formed on the surface. Below this surface, the uncharred material softens sufficiently to permit the blowing agent to cause it to expand to thereby provide further protection to the unsoftened and unexpanded material below. The resultant effect is unexpected inasmuch as the cured insulation is thermosetting and therefore would not normally be expected to soften and expand in this manner. It can be visualized that the layer of softened and expanded material will move progressively inwardly toward the protected surface as the outer surface is gradually eroded away by ablation.

Various inert fillers such as asbestos fibers can also be incorporated into the insulating composition in amounts up to as much as about 100 parts per 100 parts of epoxy resin.

As previously stated, boric acid greatly enhances the insulating values of the composition and can be used in amounts up to 200 parts by weight per 100 parts of epoxy resin. It has been found that 50 parts, in practice, is a reasonable upper limit; if less than 1 part is used, there is no noticeable improvement.

The following illustration is presented to clarify the teachings of the invention, without serving as a limitation thereon.

A basic formulation comprising the following components:

| | Parts by weight |
| --- | --- |
| Liquid polysulfide polymer | 180 |
| Epoxy resin (epichlorohydrin/bisphenol A) | 100 |
| DMP-30 (tertiary amine curing agent) | 10 |
| Boric acid | 20 |
| Asbestos fibers | 20 |
| Celogen (a blowing agent comprising p,p'-oxy-bis benzenesulfonyl hydrazide) | 10 | was used to prepare a trowelable insulation. A test disc two inches in diameter and one-half inch thick was molded from this material and was then cured at ambient temperatures for about 24 hours at atmospheric pressure. The specific gravity of the sample was about 1.3.

The disc was subjected to the flame of an oxyacetylene torch in order to determine its resistance to the flame. For the test, an oxyacetylene torch was selected which had a 0.075 inch diameter nozzle. This nozzle was positioned exactly one inch above the center of the upper surface of one of the discs, perpendicular thereto. The torch was mounted in such a manner that it could oscillate through an arc of 60° from the perpendicular, thereby changing the direction of the flame without moving the point of contact of the flame on the test disc. The purpose of this oscillation was to simulate the turbulent flow conditions which exist during the actual firing of a rocket motor. The nozzle was oscillated at a rate of 10 cycles per minute and the test was continued for 90 seconds.

Examination of a cross section of the disc after testing revealed a bottom layer of apparently unaffected material, an intermediate layer of material which had undergone expansion and a top layed of char. This char was composed of a carbonaceous material as well as the residues of the various fillers and other materials present in the composition. The thicknesses of these different layers were measured, and from these measurements was calculated the important determinant referred to as the Material Loss Rate (MLR). The material loss rate is equal to $$\frac{T_o - T_v}{E}$$

where $T_o$ is the original thickness in inches of the disc, $T_v$ is the minimum thickness of the unaffected material (bottom layer) as measured at the center of the disc at the end of the test, and E denotes, in seconds, the length of the test period. The test yielded a resultant MLR of $8 \times 10^{-4}$ in./sec. for a 90 second exposure time.

For comparative purposes, the same formulation but without the blowing agent was used to make a test disc having a density of 1.25. This sample gave a value of $20 \times 10^{-4}$ in./sec. when tested for the same duration. Similarly, a sample containing 20 parts of hollow glass spheres having a particle size range of from about 30 to 300 microns gave a value of $19 \times 10^{-4}$ in./sec. for a 90 second test and a preblown sample prepared by charging a quantity of the same material containing 20 parts of Celogen into a mold and curing at 280° F. to produce a disc having an initial density of 0.86 gave a value of $32 \times 10^{-4}$ in./sec. for a 90 second exposure.

Thus it can be seen that the Material Loss Rate of the insulation of the present invention is appreciably lower than that obtained from other samples which do not foam or expand in use, a highly unexpected and unobvious result.

The epoxy resin used in the above tests was an epichlorohydrin/bisphenol A resin having an epoxide equivalent of 180–195 and an approximate molecular weight of 380. The polysulfide had an approximate molecular weight of 1000 and was a liquid at room temperature. However, it is understood, as previously stated, that other epoxy resins and flexibilizing agents can be utilized in the teachings of the present invention. Furthermore, other changes can be made in the formulations without departing from the substance of this invention which is limited only by the scope of the following claims.

What is claimed is:

1. A thermosetting trowelable insulation material that cures at room temperature and that can be thereafter expanded at elevated temperatures, comprising:
   (A) the reaction product of an aromatic epoxy resin that is normally liquid at room temperature and contains more than one 1,2 epoxy groups per molecule and a sufficient amount but less than one equivalent weight of a compatible mercaptan terminated aliphatic polysulfide flexibilizing agent,
   (B) between about 1 and about 50 parts of boric acid per 100 parts of epoxy resin,
   (C) between about 0 and about 100 parts of asbestos fibers per 100 parts of epoxy resin,
   (D) a room temperature non-oxidizing curing agent in sufficient quantity to completely cure the reaction product, and
   (E) an organic blowing agent having a decomposition temperature above the curing temperature of the insulation.

2. The insulation of claim 1 wherein the curing agent comprises a tertiary amine.

3. The insulation according to claim 1 wherein the blowing agent is selected from the group consisting of hydrazides, azo compounds and nitroso compounds and has a decomposition temperature between about 130 and 200° C.

4. A rocket insulation cured at room temperatures using a non-oxidizing curing agent comprising:
   (A) the recation product of one mole equivalent weight of an epoxy resin that is normally liquid at room temperatures and that contains more than one 1,2 epoxy groups per molecule, and a sufficient amount but less than one mole equivalent weight of a liquid mercaptan terminated aliphatic polysulfide flexibilizing agent,
   (B) between about 1 and about 50 parts by weight of substantially unreacted boric acid per 100 parts of epoxy resin,
   (C) between about 0 and about 100 parts of asbestos fibers per 100 parts of epoxy resin, and
   (D) an organic blowing agent having a decomposition temperature of between about 130° and 200° C.

5. The method of protecting a substrate such as a rocket lining that is to be subjected to elevated temperatures comprising applying a trowelable, room curing insulation layer over the substrate, said layer having the following composition:
   (A) the reaction product of a mole equivalent weight of an epoxy resin that is normally liquid at temperatures below about 65° C. and containing more than one 1,2 epoxy groups per molecule and a sufficient amount but less than one mole equivalent weight of a liquid, mercaptan terminated aliphatic polysulfide flexibilizing agent,
   (B) between about 1 and about 50 parts by weight of boric acid per 100 parts of epoxy resin,
   (C) between about 0 and about 100 parts of asbestos fibers per 100 parts of epoxy resin, and
   (D) a room temperature non-oxidizing curring agent in sufficient quantity to completely cure the reaction product,
   the improvement comprising adding to the composition an organic blowing agent having a decomposition temperature of between about 130° and 200° C. and capable of expanding the insulation layer after curing to retard the material loss rate of the insulation when subjected to high temperature ablative conditions.

6. The method according to claim 5 wherein the organic blowing agent is selected from the group consisting of hydrazides, azo compounds and nitroso compounds.

7. The method of foaming a cured insulating composition which is composed of the reaction product of an epoxy resin and a mercaptan terminated aliphatic polysulfide in a sufficient amount to make the epoxy resin flexible, between 1 and about 50 parts of substantially unreacted boric acid and between 0 and 100 parts of asbestos fibers per 100 parts of the epoxy resin, said method comprising incorporating up to 50 parts of an organic blowing agent into the product before curing, then curing the reaction product at room temperature using a non-oxidizing curing agent and thereafter heating the product to a temperature above which the product becomes soft and the blowing agent decomposes.

References Cited

UNITED STATES PATENTS

| 2,739,134 | 3/1956  | Parry et al. |         |
|-----------|---------|--------------|---------|
| 2,825,282 | 3/1958  | Gergen et al.|         |
| 3,057,809 | 10/1962 | Newey.       |         |
| 3,296,153 | 1/1967  | Snogren.     |         |
| 3,457,215 | 7/1969  | Sommer       | 260—830 |

JOHN C. BLEUTGE, Primary Examiner

U.S. Cl. X.R.

260—8, 30, 37, 47, 79, 830